(12) United States Patent
Morimoto et al.

(10) Patent No.: US 6,397,601 B2
(45) Date of Patent: Jun. 4, 2002

(54) MOTOR ASSIST CONTROL APPARATUS FOR VEHICLE

(75) Inventors: Kazuhiko Morimoto; Yoshiaki Omata; Kazuyoshi Noda, all of Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/842,520

(22) Filed: Apr. 25, 2001

(30) Foreign Application Priority Data

Apr. 28, 2000 (JP) ........................................ 2000-128696

(51) Int. Cl.[7] .............................................. F01B 21/04
(52) U.S. Cl. ........................... 60/706; 60/698; 180/65.2
(58) Field of Search ........................ 60/698, 706, 710; 180/65.1, 65.2, 65.3, 65.4, 65.5

(56) References Cited

U.S. PATENT DOCUMENTS

| | | | |
|---|---|---|---|
| 4,771,606 A | * 9/1988 | Mose et al. | ................ 60/706 X |
| 5,841,201 A | 11/1998 | Tabata et al. | |
| 5,935,040 A | 8/1999 | Tabata et al. | |
| 6,173,574 B1 | * 1/2001 | Obayashi et al. | ......... 60/706 X |
| 6,230,496 B1 | * 5/2001 | Hofmann et al. | ............. 60/706 |

FOREIGN PATENT DOCUMENTS

JP          9-58295          3/1997

OTHER PUBLICATIONS

U.S. application No. 09/523,209, filed Mar. 10, 2000 Controller of Vehicle Propulsion System.
U.S. application No. 09/539,424, filed Mar. 30, 2000 Motor Drive Control Apparatus.
U.S. application No. 09/539,000, filed Mar. 30, 2000 Motor Drive Controller for Vehicle.

* cited by examiner

Primary Examiner—Hoang Nguyen
(74) Attorney, Agent, or Firm—Flynn, Thiel, Boutell & Tanis, P.C.

(57) ABSTRACT

A motor assist control apparatus for a hybrid vehicle having an engine and an electric motor includes a first map that executes power-generating operation of the motor from both engine rotational speed and engine load during traveling of the hybrid vehicle. A second map executes driving operation of the electric motor when the load detected by a load detector exceeds a set value during traveling of the hybrid vehicle. A use demand input switch inputs a second map use demand input signal by manual operation. A controller executes both drive and power-generating operations for the motor based on a driving state of the hybrid vehicle and a driving state of the engine. The control apparatus executes a drive operation for the electric motor and switches over use to the second map when a use demand signal is input and when second map use conditions are satisfied. As a result, the motor assist control apparatus can realize smooth acceleration on the basis of selection by a driving person during traveling of the hybrid vehicle. The control apparatus does not require an exclusive map, and can contribute to a simplified control system.

3 Claims, 5 Drawing Sheets

MOTOR ASSIST CONTROL APPARATUS FOR VEHICLE

FIELD OF THE INVENTION

This invention relates to a motor assist control apparatus for a hybrid vehicle which can realize smooth acceleration on the basis of a decision by the driving person during traveling of a hybrid vehicle. The apparatus can improve drive-ability, and does not require an exclusive map, and thus can contribute to simplification of a control system.

BACKGROUND OF THE INVENTION

Some motor vehicles are of a type commonly called a hybrid vehicle having an internal combustion engine and an electric motor disposed therein as the power sources of a propulsion system. The engine mounted on the hybrid vehicle is directly connected to an electrical motor having a vehicle driving function and an electrical power generating function. The hybrid vehicle has a motor assist control apparatus to control both driving and power-generating states of the motor based on a driving state of the vehicle and a driving state of the engine.

One such example of a control apparatus of a hybrid vehicle is disclosed in published Japanese Application Laid-Open No. 9-58295. The motor assist control apparatus in this disclosure includes a motor connected with an engine output shaft, and a hand-operated switchover means to perform switchover for more than one mode. An accelerator detecting means detects a quantity of accelerator operation, and a control means controls an output torque characteristic of said motor for a quantity of accelerator operation according to a mode set by hand-operated switchover means.

In a hybrid vehicle, a motor assist control apparatus controls so as to continue an assist of an engine by driving a motor for a vehicle when a throttle valve of an engine, in particular, is fully opened in high load driving operation. The motor assist control apparatus can also control so as to execute an assist of an engine by driving a motor for a vehicle at an initial term only in high load driving operation of the engine.

In a first mode, to continue an assist by a motor for a vehicle in high load driving of an engine depends on deciding to drive a motor for a vehicle so long as the volume of a battery of a motor for a vehicle is permitted. In a second mode, to execute an assist by a motor for a vehicle at only an initial term in high load driving of an engine depends on deciding to control consumption of a battery by asynchronously driving the motor.

In the first mode, there is a problem in that a motor for a vehicle cannot drive when a battery is completely discharged. In the second mode, there is the problem that an engine may not always fully receive a benefit of assist by a motor for a vehicle because a battery has a large amount of electric power.

Accordingly, a traditional motor assist control apparatus for a hybrid vehicle cannot realize an assist by a motor on the basis of a decision by a driving person during traveling of the vehicle, and cannot realize smooth acceleration. Consequently, drive-ability cannot be improved.

Moreover, in the motor assist control apparatus disclosed in published Japanese Application Laid-Open No. 9-58295, there is a problem in that an excessive electric discharge of a battery can occur because in one mode selected by a hand-operated switchover means, the battery is forcibly controlled.

In order to obviate or minimize the above problems the present invention provides a motor assist control apparatus for a hybrid vehicle having an engine and an electric motor disposed therein. The electric motor has both driving and power-generating functions and is directly connected to the engine mounted on the hybrid vehicle. The control apparatus includes an engine rotational speed detecting means, an engine load detecting means, a first map used in order to execute power-generating operation of the motor by searching power-generation operating torque order values in response to detected engine rotational speed and engine load detected from accelerator means during traveling of the hybrid vehicle. A second map is used in order to execute driving operation of the motor by searching for a drive operating torque order value in response to both the engine rotational speed and engine load, when the detected load has exceeded a set value during traveling of the hybrid vehicle and a use demand input switch issues a second map use demand input signal by manual operation. A controller executes both drive and power-generating operations of the motor based on a driving state of the hybrid vehicle and a driving state of the engine, and executes a drive operation for the vehicle switching over use to the second map when the second map use demand signal is input and when second map use conditions are satisfied.

In this invention, the motor assist control apparatus for a vehicle executes both drive and power-generating operations of a motor for a vehicle based on a driving state of a hybrid vehicle and a driving state of an engine, and by use demand input means. The apparatus executes drive operation of the motor by switching over use to a second map when the second map use demand signal is input and when the second map use condition is satisfied. Accordingly, while the motor assist control apparatus controls consumption for a main battery that supplies electric power to the motor during traveling of the hybrid vehicle, in a formation region of the second map use condition, an assist for the engine by the motor on the basis of a selection by a driving person can be realized by using the second map. An assist by the motor on the basis of the will of a driving person can also be realized by utilizing first and second maps for existing common map control.

DETAILED DESCRIPTION OF THE INVENTION

Figure 2:
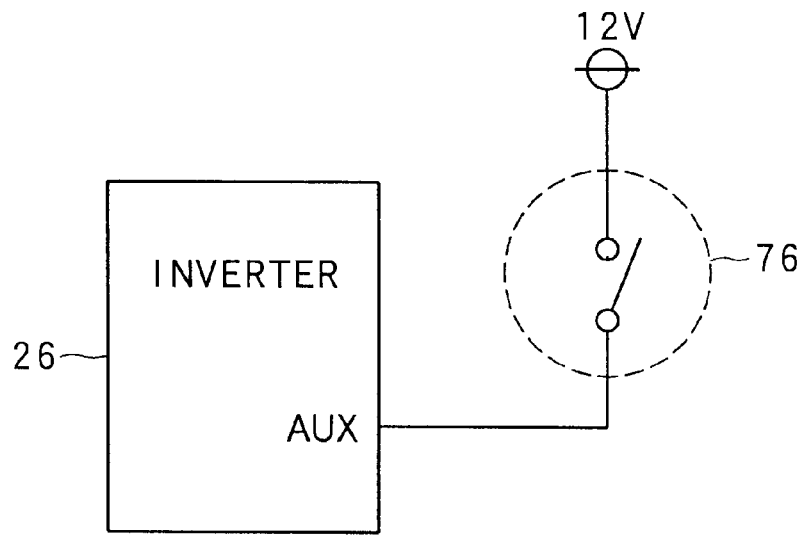
FIG. 2 is a block diagram of a motor control means showing a use demand input switch connected thereto.
Figure 3:
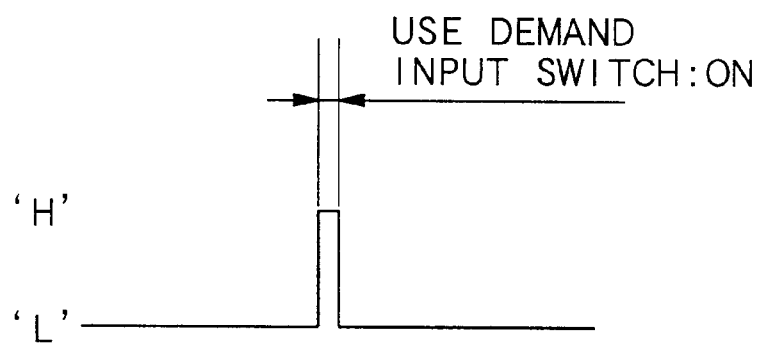
FIG. 3 is an illustration showing a signal by "ON/OFF" operation of a use demand input switch.
Figure 4:
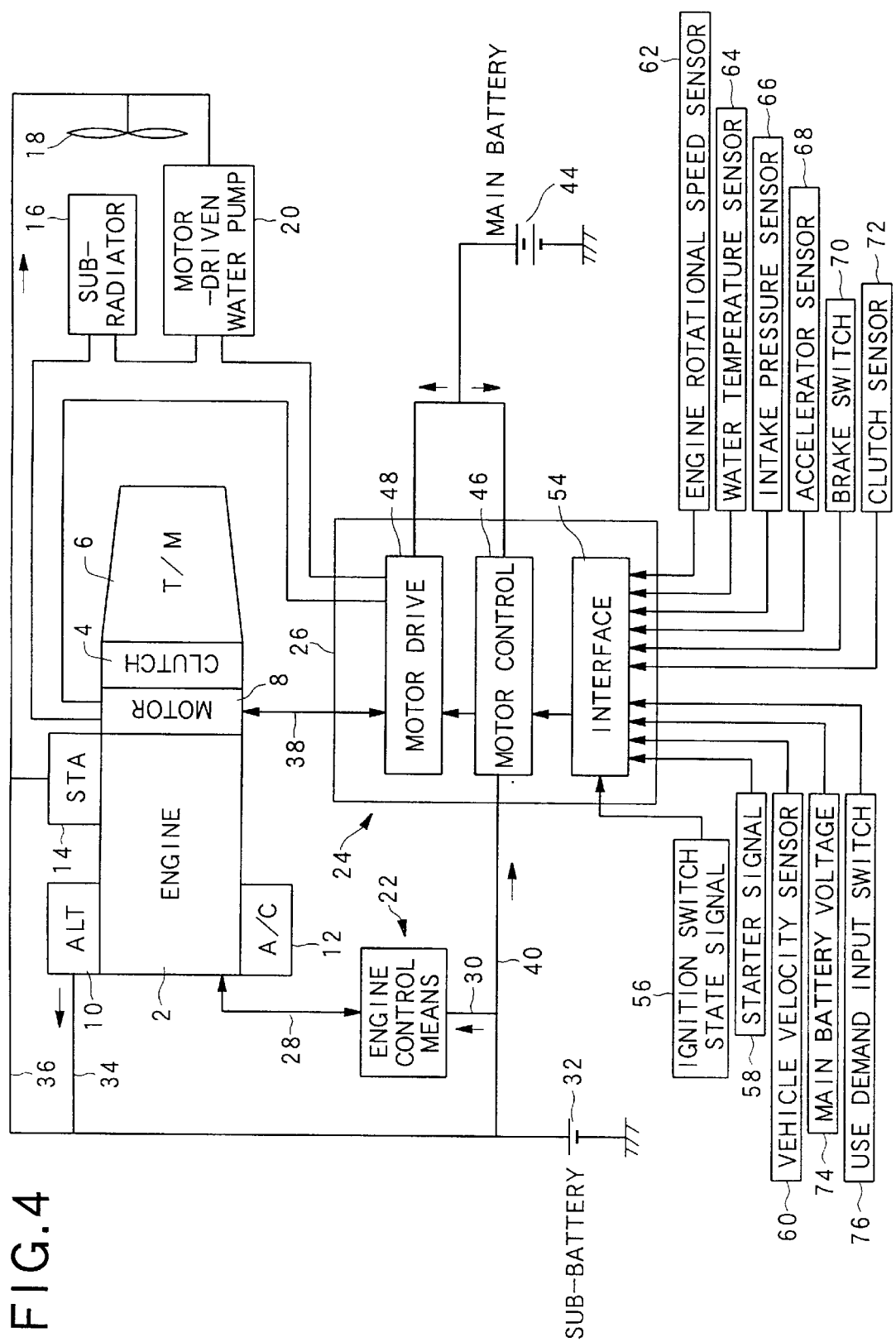
FIG. 4 is a block diagram showing a system of a motor assist control apparatus for a vehicle.

The present invention will now be described in specific detail with reference to FIGS. 1–6 which illustrate an embodiment of the invention. FIG. 4, illustrates an engine 2 mounted on a hybrid vehicle (not shown), a clutch 4 and a manual transmission 6. The transmission is connected with engine 2 through the clutch 4. The transmission 6 builds in a gearing gear of more than one-grade, for example, a gearing gear of a five-grade or live-speed system (not shown).

An electric motor 8 (hereinafter described as "motor") having a driving function and a power generating function is directly connected to the engine 2. The motor 8 is directly connected to a side of a flywheel of a crank shaft (not shown) of the engine 2. Incidentally, the motor 8 may be directly connected to a side of a crank sprocket of the crank shaft. The motor 8 has a rotor and a stator coil.

The engine 2 includes an alternator 10 for power-generation, an air-compressor 12 for an air-conditioner, a starter motor 14 for starting up the vehicle, a sub-radiator fan 18 of a sub-radiator 16 for cooling the motor 8, and an electrically-driven water pump 20. The alternator 10 and the air compressor 12 are connected to the crank shaft by pulleys and belts (not shown). The starter motor 14 is connected to the flywheel by engageable and disengageable pinion and ring gears (not shown).

The engine 2 mounted on a hybrid vehicle is controlled in an operating state by an engine control means 22. The motor 8 mounted on the hybrid vehicle is controlled in both driving and power-generating states by a motor control means 26 that is a part of assist control apparatus 24.

The engine 2 is connected to the engine control means 22 through an engine-controlling signal line 28. "Line" is used herein to describe any electrical signal conduit. The engine control means 22 is linked to a sub-battery 32 through an engine control means-dedicated power line 30. The sub-battery 32 is coupled to the alternator 10 through a sub-battery-charging power line 34 and to the starter motor 14, sub-radiator fan 18 and electric water pump 20 through sub-battery-driving power line 36. The sub-battery 32 is charged by generated electric power from alternator 10, and supplies driving electric power to starter motor 14, sub-radiator fan 18 and electric water pump 20. The sub-battery 32 is a conventional 12-volt vehicle battery.

The motor 8 is connected to the motor control means 26 through a motor-controlling signal line 38. The motor control means 26 is linked to the sub-battery 32 through a motor control means-dedicated sub-power line 40. The motor control means 26 is also coupled to a main battery 44 through a motor control means-dedicated main power line 42. The main battery 44 supplies driving electric power to the motor 8 and is charged by generated electric power from the motor 8.

The engine control means 22 to control the engine 2 has a fuel injection control section (not shown), ignition time control section, and ISC (idle speed control) section (not shown). The engine control means 22 controls a quantity of fuel injected and the ignition time of engine 2 according to an operating state by a signal input from an engine rotational speed sensor 62 and a water temperature sensor 64 mentioned later.

Figure 5:
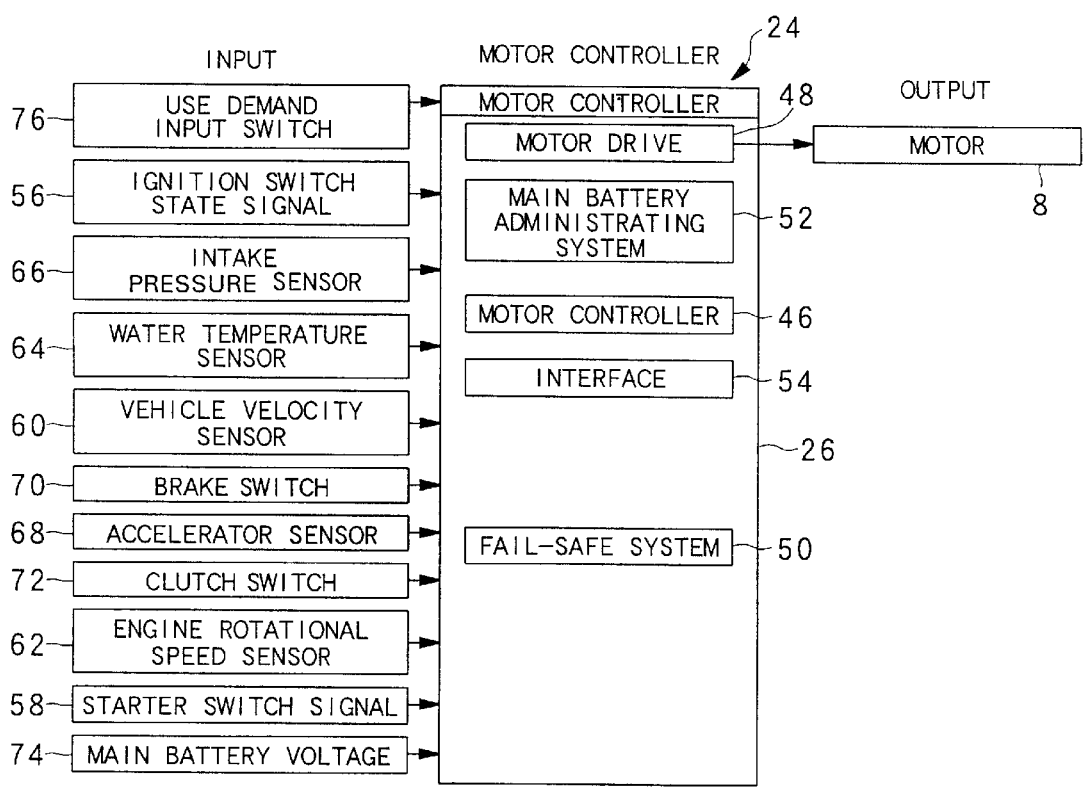
FIG. 5 is a block diagram of a motor control means.

The motor control means 26 to control the motor 8, as shown in FIG. 5, includes motor control 46, motor drive 48, input/output processing section (interface) 50, main battery administrating section 52 and a fail-safe section 54.

The motor control means 26 connects ignition switch 56, starter switch 58, vehicle velocity sensor 60, engine rotational speed sensor 62, water temperature sensor 64, intake pressure sensor 66, accelerator sensor 68, brake switch 70, clutch switch 72, main battery voltage detector 74 and a use demand input switch for a use demand input means to an input side, and connects motor 8 to an output side.

The motor control means 26, by a signal input from the use demand input switch 76, controls both driving and power-generating states of motor 8 according to various control states based on a driving state of engine 2 and an operating state of a hybrid vehicle.

Figure 6:
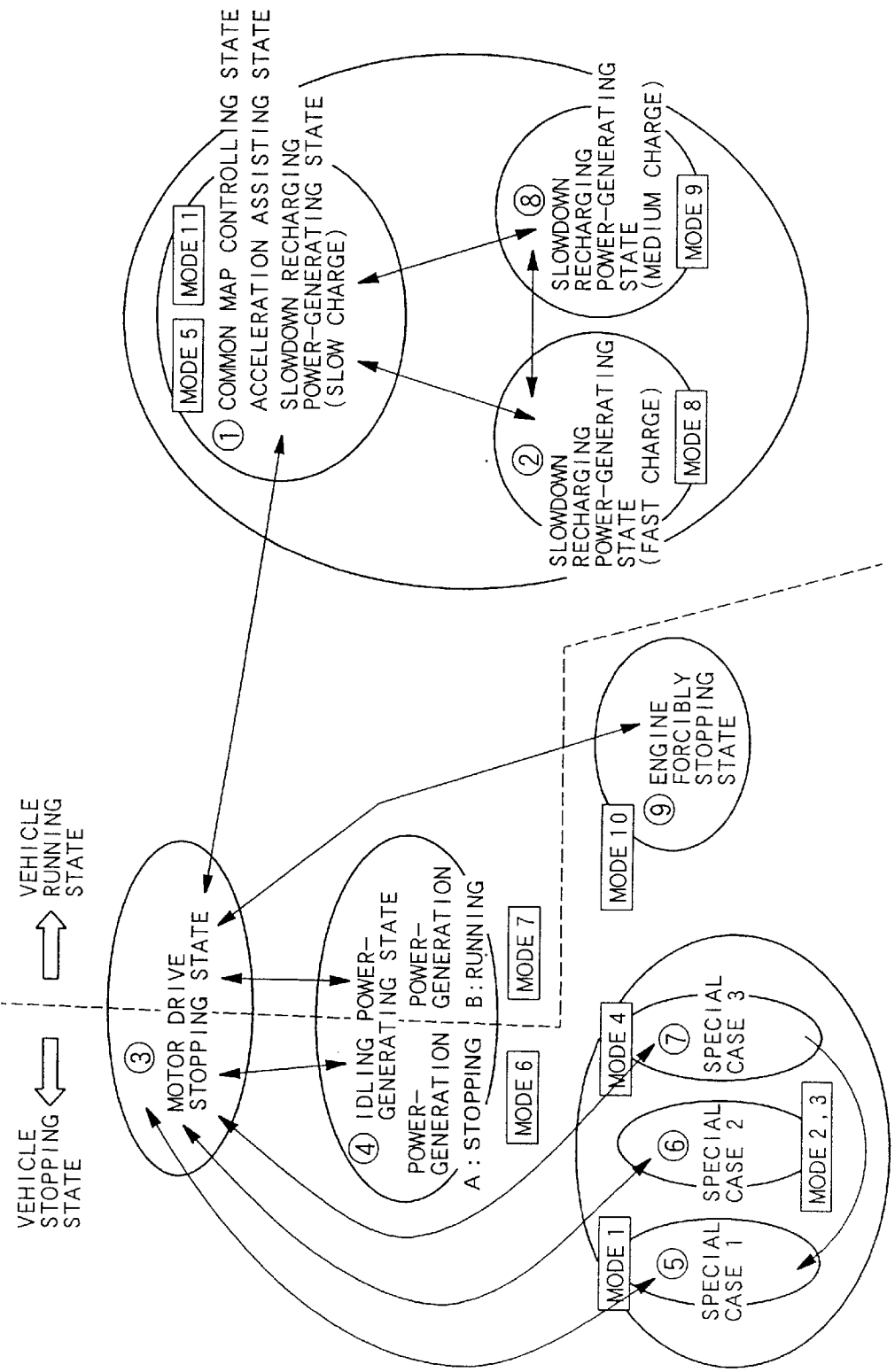
FIG. 6 is a diagram showing switchover of a control state.

A control state (mode) of motor 8 controlled by motor control means 26, as shown in FIG. 6, is one of the following ten states.

(1) common map for acceleration assist and slowdown recharging power generation control (slow charging): mode 5;

(2) slowdown recharging power-generating control (fast charging): mode 8;

(3) motor driving stop control (waiting state to determine if each switchover condition is satisfied);

(4) idling power-generating control: mode 6 (A: during stop) and mode 7 (A: during traveling);

(5) special case control 1 (starting assist): mode 1;

(6) special case control 2 (start-up assist): mode 2 (waiting) and mode 3 (executing);

(7) special case control 3 (idle rotational speed stabilization assist): mode 4;

(8) medium charging power-generating control: mode 9;

(9) engine forcibly stopped control: mode 10; and

(10) manual assist control: mode 11.

Switchover of the control states, based on a driving state of a vehicle, is executed as follows.

1. During execution of control states of (1), (2), (4) and (8), when conditions for switching over to control states (5), (6), (7) and (9) are satisfied, the control states of (1), (2), (4) and (8) are removed forcibly, and the control states of (5), (6) and (7) are switched over through the motor driving stop control state (3).

2. Special case control 1 and 2 ((5) and (6)) do not directly switch over to other special case control 3 ((7)).

3. After being switched over, control states (5), (6), (7) and (9) do not switch over to other control states until a removing condition is satisfied. But, in special case control 3 (state 7), when a switchover condition to special case control 1 (state 5) is satisfied before a removing condition is satisfied, the special case control 3 is switched over to special case control 1 (state 5).

Accordingly, the motor control means 26, by a signal input from a use demand input switch 76 for ignition switch 56, controls both driving and power-generating states of motor 8 according to various control states based on a driving state of engine 2 and an operating state of a hybrid vehicle.

This assist control unit 24 for a motor 8 of a hybrid vehicle, as shown in FIGS. 4 and 5, links engine rotational speed sensor 62 for engine rotational speed detecting means and an accelerator sensor 68 for load detecting means to motor control means 26.

Motor control means 26 searches power-generation operating order values or selected torque values from both engine rotational speed detected by an engine rotational speed sensor 62 and engine load detected by an accelerator sensor 68 during traveling of a hybrid vehicle, and memorizes a first map (not shown) that is used to execute power-generating operation of motor 8. In addition, the motor control means 26 searches a drive operating order value or torque value from both engine rotational speed and engine load when the load detected by accelerator sensor 68 has exceeded a set value, during traveling of a hybrid vehicle, and memorizes a second map (not shown) that is used in order to execute driving operation of motor 8. The use of search maps for finding torque values for power-generating to charge a battery and motor driving is disclosed in related U.S. patent application Ser. No. 09/825,194 (Saigoh 273)

filed Apr. 3, 2001, the disclosure of which is hereby incorporated by reference.

Motor control means 26 includes both the first and second maps used during traveling of a hybrid vehicle, and also includes other maps (not shown) that are used to execute drive operation and power-generating operation of motor 8 based on an operating state of the hybrid vehicle and a driving state of engine 2. The motor control means 26, by a signal input from use demand input switch 76, switches over various maps, and controls both driving and power-generating states of motor 8 according to various control states based on an operating state of a hybrid vehicle and a driving state of engine 2.

Moreover, motor control means 26 links the use demand input switch 76 for the use demand input means. This use demand input switch 76, as shown in FIG. 2, is linked to auxiliary input part "AUX" of motor control means 26, and is operated "ON/OFF" by manual operation. As shown in FIG. 3, the use demand input switch 76, in case of "ON" operation, inputs "H" signal that is a second map use demand signal for switching over use of the first map to use of a second map, to motor control means 26. Incidentally, the use demand input switch 76, in case of "OFF" operation, inputs a "L" signal that is a second map non-use demand signal, to motor control means 26.

When the "H" signal is input by "ON" operation of use demand input switch 76, motor control means 26 judges that the second map use demand signal for switching over use of the first map to the second map has been input. When a second map use demand signal is input by use demand input switch 76 and when a second map use condition is satisfied, motor control means 26 controls to switch over to use of the second map and to execute a drive operation of motor 8.

Moreover, when executing the acceleration assist control (mode 5) during traveling of a hybrid vehicle, motor control means 26 controls to adopt a second map use demand signal input by actuation of use demand input switch 76.

Furthermore, when formation of the second map use condition has occurred for more than a set number of times, motor control means 26 controls to not adopt a second map use demand signal.

In other words, at high load driving of engine 2 (in particular, when a throttle valve is opened fully), the assist control apparatus 24 of motor 8 has the system not continuously assisting engine 2 by motor 8. Accordingly, when engine 2 is performed continuously at its high load driving, a driving person can control to assist the engine 2 by intentionally driving motor 8 by hand-operation. As a result, consumption of main battery 44 can be suppressed by main battery administration part 52. Then engine 2 is assisted by driving motor 8 controlled by motor drive part 48 as required in a permissible range, so that a smooth driving operation may be realized.

This assist control unit 24 divides each region of both first and second search maps in the common map control (mode 5) and sets a torque order value or torque value as a predetermined drive operating value and a predetermined power-generation operating value. The first map principally sets power-generation, and the second map principally sets drive values.

When switchover to the second map occurs, assist control apparatus 24 searches to superimpose the second map on the first map. Fundamentally, the assist control apparatus 24 controls to search for a first torque value of the second map and to converge with a torque value of the first map. When a use demand signal for the second map is input by hand-operation of a driving person, then the assist control apparatus 24 controls to start a value of a current search point of the second map, and to converge the first map according to a regular routine.

By the above, while the assist control apparatus 24 has a large power-generating region, the assist control apparatus 24 generates a driving torque in motor 8 according to pressing on of an accelerator pedal of fixed quantity as if the assist control apparatus 24 executes an asynchronous operation (supplementary acceleration). Accordingly, this system can execute a manual assist in high load and can improve drive-ability.

Therefore, in the common map control (mode 5), the assist control apparatus 24 of motor 8 controls power-generating operation of motor 8 using the first map, and when an assist for engine 2 is required, the assist control apparatus 24 controls motor 8 so as to forcibly execute drive operation of the motor 8.

During enforcement of common map control (mode 5), the assist control apparatus 24, when the second map use demand signal has been input by use demand input switch 76, forcibly switches over to use of the second map from the first map, and executes drive operation of motor 8 by map searching for a drive operation order value (determined torque value) from the second map, and executes manual assist control (mode 11) so as to assist engine 2.

The assist control apparatus 24 switches over searching to the second map while load axis coordinates and engine rotational speed coordinates of map search by first map are in a given position. Attenuation start time and attenuation slope by attenuation control after started drive operation of motor 8 are same during routine processing as after started search for the second map.

Switchover from searching by the first map to searching by the second map is executed forcibly by "ON" operation (input of second map use demand signal) via manual operation of use demand input switch 76. Thus, the second map use condition is set, in an effective motor operating region by "ON" operation of use demand input switch 76.

At the second map use condition, including "ON" operation of the use demand input switch 76, the following conditions shall be set: the first map in common map control (mode 5) is searched; the equation "accelerator pedal press quantity (throttle open degree) $\geq$ set value (#Thr)" is satisfied; the equation "load axis search coordinates $\geq$ set value (#MAPLINE)" is satisfied; and, a start prohibition flag is cleared.

Assist control apparatus 24, when the second map use condition is satisfied, executes a search of the second map, drive control of motor 8 and attenuation control. However, the operation after the condition is satisfied is the same as the processing of searches in the second map in common map control (mode 5) as usual.

Moreover, the assist control apparatus 24, when the second map use condition is satisfied, increases a counter for the start prohibition flag set, which is a hardware drive demand counter by search of the second map. This counter for start prohibition flag set is cleared after power-on of assist control apparatus 24 and when common map control (mode 5) is cancelled (when the common map control is finished).

The start prohibition flag limits a hardware drive demand operation by search of the second map. Therefore, when formation of the second map use condition occurs more than a set number of times (for example, two times), then the start prohibition flag is set and is cleared by cancellation of common map control (mode 5) (the common map control ends).

Figure 1:
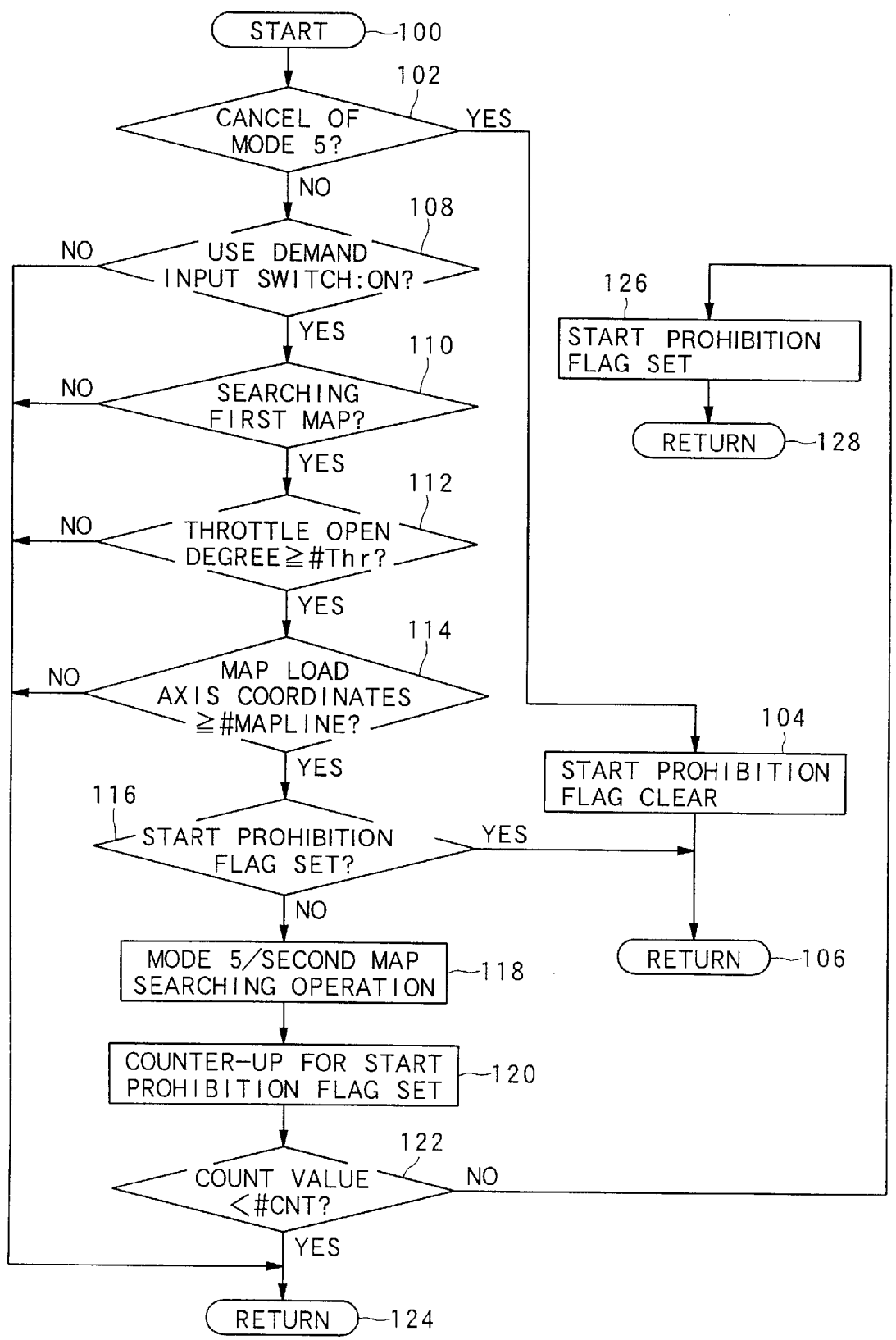
FIG. 1 is a control flowchart of a motor assist control apparatus for a vehicle showing an embodiment of the present invention.

Operation of this embodiment is described as follows. Referring now to FIG. 1, when assist control apparatus 24 of motor 8 mounted on a hybrid vehicle starts control at step 100 by motor control means 26, then a determination is made at step 102 as to whether the common map control (mode 5) is cancelled.

When the determination in step 102 results in "YES", then a start prohibition flag is cleared, and the routine is returned at step 106. When the determination in step 102 results in "NO", then a determination is made at step 108 as to whether a second map use demand signal is input by use demand input switch 76. If yes, a determination is made at step 110 as to whether a first map is being searched. If yes, a determination is made at step 112 as to whether throttle open degree detected from accelerator sensor 68 is more than a set value (throttle open degree ≧#Thr). If yes, a determination is made at step 114 as to whether load axis search coordinates are more than a set value (load axis search coordinates ≧#MAPLINE).

Both determinations as to whether throttle open degree detected from accelerator sensor 68 is more than a set value (throttle open degree ≧#Thr) and whether load axis search coordinates are more than a set value (load axis search coordinates ≧#MAPLINE) are used to judge whether an assist by manual assist control (mode 11) is required in high load drive (opened throttle valve) of engine 2 that executes acceleration assist control (mode 5) of common map control.

When all determinations in steps 108 to 114 are "YESl", then a determination is made at step 116 as to whether a start prohibition flag is set.

When the determination in step 116 is "YES", then the routine is returned at previous step 106. When the determination in step 116 is "NO", then search of a second map by the common map control (mode 5) is executed at step 118. Immediately, engine 2 is assisted by drive operation of motor 8 by manual assist control according to a searched drive operation torque value, and a start prohibition flag set counter is increased at step 120. A determination is then made at step 122 as to whether a value of the start prohibition flag set counter is under a set value (count value <#CNT).

When the determination in step 122 is "YES", then the routine is returned at step 124. When the determination in step 122 is "NO", then a start prohibition flag is set at step 126, and the routine is returned at step 128.

Incidentally, when one of the determinations in steps 108 to 114 is "NO", the routine is returned at previous step 124.

Thus, by motor control means 26, the assist control apparatus 24 of motor 8 controls to execute both drive and power-generating operations of motor 8 based on a driving state of a hybrid vehicle and a driving state of an engine 2. When the second map use demand signal is input by use demand input switch 76 and when the second map use condition is satisfied, the assist control apparatus 24 controls to execute drive operation of motor 8 by switching over to the second map.

By this system, the assist control apparatus 24 controls consumption of main battery 44 that supplies electric power to motor 8 during traveling of a hybrid vehicle, by power-generating operation using a first map in a formation region of the second map use condition. An assist of engine 2 by motor 8 on the basis of selection by a driving person can be realized by using the second map, and an assist by motor 8 on the basis of selection by a driving person can be realized by utilizing the first and second maps for existing common map control.

Therefore, this assist control apparatus 24 of motor 8 can execute acceleration on the basis of will of a driving person by hand-operation of the use demand input switch 76. Thus, the assist control apparatus 24 can realize smooth acceleration on the basis of driven selection during traveling of a hybrid vehicle, and can improve drive-ability. Moreover, because of use of existing first and second maps, an exclusive map is not required. Accordingly, this assist control apparatus can contribute to simplification of a system.

Moreover, when executing acceleration assist control (mode 5) during traveling of a hybrid vehicle, the assist control apparatus 24 controls to adopt second map use by a use demand signal input from use demand input switch 76. Thus, because this assist control apparatus 24 can be used only in a required mode (conditions), abuse of use demand input switch 76 is prevented. Consequently, life of main battery 44 can be extended. By the extension of battery life, reliability of the whole system can be improved, and product quality increased.

Further, when formation of the second map use condition has been for more than a set consecutive number of times, the motor control apparatus 24 does not adopt second map use demand signal because a constant limit for an assist of motor 8 by hand-operation of a driving person is reached. Consequently, an excessive electric discharge of a battery is avoided, and the battery life is extended.

Furthermore, the assist control apparatus 24 can improve the degree of freedom of combination between engine 2 and motor 8, and can spread a power-generation region by using double maps in the region set conventionally by a drive torque order value only. Accordingly, a utilized region of drive order values can be set separately, and asynchronous operation becomes possible.

This invention is not limited to the above-mentioned embodiments, but is suitable to many possible innovations and applications. For example, in the above embodiment, although a drive operation of motor 8 is executed by using a second map when throttle open degree is more than a set value (throttle open degree >#Thr), by switching over a driving state of motor 8 according to a time change rate of throttle open degree and by increasing and decreasing a quantity of assist according to a driving state, a quantity of assist can instead be obtained according to an accelerator pedal depressed state.

Thus, while the motor assist control apparatus controls consumption of main battery 44 that supplies electric power to the electric motor 8 during traveling of a hybrid vehicle, an assist of the engine 2 by the motor on the basis of will of a driving person can be realized, and an assist by the motor for the vehicle can be realized by utilizing an existing control map.

Accordingly, the motor assist control apparatus can realize smooth vehicle acceleration on the basis of selection by a driving person during traveling of a hybrid vehicle, and can improve drive-ability. The apparatus does not require an exclusive map, and can contribute to simplification of a vehicle control system.

What is claimed is:

1. A motor assist control apparatus for a vehicle having an internal combustion engine and an electric motor disposed therein, the electric motor having both driving and power-generating functions and directly connected to the engine mounted on the hybrid vehicle, comprising: an engine rotational speed detecting means for said engine, a load detecting means for said engine; a first map used in order to execute power-generating operation of said electric motor by searching for power-generation operating torque order values in response to engine rotational speed detected by said engine rotational speed detecting means and engine load detected by said load detecting means during traveling of said hybrid vehicle; a second map used in order to execute driving operation of said electric motor by searching for a drive operating torque order value in response to said engine rotational speed and said engine load when the load detected from said load detecting means exceeds a set value during traveling of said hybrid vehicle; a use demand input means inputting a second map use demand input signal by manual operation; and a control means for controlling to execute both drive and power-generating operations of said motor based on a driving state of said hybrid vehicle and a driving state of said engine, and to execute a drive operation for switching over to use of said second map when the second map use demand input signal is input by said use demand input means and when second map use conditions are satisfied.

2. A motor assist control apparatus for a vehicle as defined in claim 1, wherein said control means controls to adopt the second map use demand input signal from the use demand input means which comprises a use demand input switch, when executing the driving assist control during traveling of the hybrid vehicle.

3. A motor assist control apparatus for a vehicle as defined in claim 1, wherein said control means controls to not adopt the second map use demand signal when formation of the second map use condition occurs consecutively more than a set number of times.

* * * * *